United States Patent
Watanabe

(10) Patent No.: US 6,612,591 B1
(45) Date of Patent: Sep. 2, 2003

(54) MULTI-FUNCTION TRUCK

(76) Inventor: Fumio Watanabe, 5189 Moro-oaza, Isezaki-shi, Gunma, 372-0034 (JP)

( * ) Notice: Subject to any disclaimer, the term of this patent is extended or adjusted under 35 U.S.C. 154(b) by 0 days.

(21) Appl. No.: 09/506,444

(22) Filed: Feb. 18, 2000

(30) Foreign Application Priority Data

Nov. 8, 1999 (JP) .......................................... 11-317494

(51) Int. Cl.$^7$ ................................................. B60P 3/00
(52) U.S. Cl. ........................... 280/4; 280/830; 280/838
(58) Field of Search ................................. 280/830, 838, 280/837, 839, 4; 137/355; 141/231

(56) References Cited

U.S. PATENT DOCUMENTS

| | | | | |
|---|---|---|---|---|
| 3,147,886 A | * | 9/1964 | Sacco | 222/23 |
| 3,717,805 A | * | 2/1973 | Gnaedinger et al. | 307/150 |
| 3,937,337 A | * | 2/1976 | Irving | 214/80 |
| 4,360,046 A | * | 11/1982 | Streit et al. | 141/82 |
| 4,672,520 A | * | 6/1987 | Ueda et al. | 363/37 |
| 4,771,356 A | * | 9/1988 | Hastings | 361/59 |
| 5,052,443 A | * | 10/1991 | Evangelist, Jr. | 137/899 |
| RE33,945 E | * | 6/1992 | Beaty | 141/388 |
| 5,234,319 A | * | 8/1993 | Wilder | 417/40 |
| 5,240,043 A | * | 8/1993 | Campbell | 137/899 |
| 5,326,235 A | * | 7/1994 | Bruhn | 417/410 R |
| 5,449,988 A | * | 9/1995 | Gurstein et al. | 318/430 |
| 5,609,193 A | * | 3/1997 | Steckler | 141/231 |
| 5,812,060 A | * | 9/1998 | DeSpain et al. | 340/618 |
| 5,964,258 A | * | 10/1999 | Schoenbauer | 141/231 |
| 6,084,313 A | * | 7/2000 | Frank | 290/40 C |
| 6,174,136 B1 | * | 1/2001 | Kilayko et al. | 417/44.1 |

FOREIGN PATENT DOCUMENTS

| | | |
|---|---|---|
| JP | 55-114628 | 9/1980 |
| JP | 61-160594 | 7/1986 |
| JP | 63-164500 | 10/1988 |
| JP | 5-215083 | 8/1993 |
| JP | 7-291019 | 11/1995 |
| JP | 10-166929 | 6/1998 |

OTHER PUBLICATIONS

Patent Abstracts of Japan for Publication No. 55–114628, published Sep. 4, 1980.

Patent Abstracts of Japan for Publication No. 61–160594, published Jul. 21, 1986.

Translation of the Claim in Japanese Utility Model Application Laid–open Publication No. 63–164500.

* cited by examiner

*Primary Examiner*—Anne Marie Boehler
*Assistant Examiner*—Paul Royal, Jr.
(74) *Attorney, Agent, or Firm*—Arent Fox Kintner Plotkin & Kahn, PLLC

(57) ABSTRACT

A multi-function truck of the present invention has a load-carrying platform, a pump having a motor driven by electric power from an AC power supply and mounted in a space below the load-carrying platform, and a liquid collector loaded on the load-carrying platform. The load-carrying platform also has thereon a hose having the length enough to connect one pipe-end of a suction or a delivery of the pump to the liquid collector and a hose having the length enough to connect the other pipe-end of the pump to a on-site liquid container placed at a collection site, containing an accumulated liquid, wherein a switch is disposed between a plug connected to the AC power supply and the motor, and when a load current exceeds a specified value due to a cause on the side of the truck, the electric current of the AC power supply borrowed is automatically intercepted by the side of the truck.

3 Claims, 2 Drawing Sheets

MULTI-FUNCTION TRUCK

BACKGROUND OF THE INVENTION

1. Field of the Invention

The present invention relates to a multi-function truck which can transport a cargo and also pump up liquid substance into a liquid collector loaded on its load-carrying platform to transport and supply it to a destination, and particularly relates to a multi-function truck which can automatically stop the use of an AC power supply if a load current exceeds a specified value due to any cause while a draw pump is in operation, thereby preventing any trouble from being made to the side of a lender providing the AC power supply.

2. Description of the Related Art

Recently, there is being established a recycling system that cooking oil waste discharged from enterprises, schools, shops, hospitals and others is accumulated and kept in an oil container or the like, the accumulated oil waste is collected by waste collecting companies or waste collectors around such sites and is subjected to settling processing and heating processing to adjust the ingredients, and the processed oil is delivered to waste recycling companies or engineers.

Generally, the aforesaid oil waste collecting companies or oil waste collectors go by truck to a school, for example, where oil waste is accumulated in an oil container The oil container containing the accumulated oil waste is held by several people to transfer the oil waste into an oil container loaded on the truck, and then the transferred oil waste is carried back by the truck. Therefore, there are disadvantages that the collecting operation involves lots of labor and time, besides, even if the oil waste accumulated in the oil container has settled in a natural condition to separate into a supernatant fluid and a sediment, they are mixed again transferring the oil waste from its accumulated oil container into another oil container.

To solve the aforesaid problems, the inventor has proposed a multi-function truck, which has a load-carrying platform for carrying load and a pump having a motor driven by electric power from an AC power supply and equipped in a space below the load-carrying platform, and has on the load-carrying platform a liquid collector, a hose having the length enough to connect one pipe-end of a suction or a delivery of the pump to the liquid collector, and a hose having the length enough to connect the other pipe-end of the pump to a on-site liquid container placed at a collection site containing the accumulated liquid, as disclosed in Japanese Patent Application Laid-Open No. 10-166929.

The multi-function truck according to the aforesaid proposal has accomplished to reduce working time required for the collection and transportation of oil waste and has also achieved high efficiency to separately collect a supernatant fluid and a sediment. Besides, the load-carrying platform itself can be used for carrying load in addition to the aforesaid function, so that this truck has an advantage that it can also serve as a water supply truck while carrying relief supplies.

On the other hand, the aforesaid multi-function truck is equipped with the pump with the motor driven by electric power from an AC power supply and uses the AC power supply at a collection site (e.g., a school, a restaurant, etc.), where a collected liquid is accumulated, by connecting a plug of the motor into an outlet of the AC power supply of the collection site. Therefore, there is a possibility of causing an accident such as a power failure due to the interception of an electric circuit by a switch when a load current from the AC power supply of the lender's side exceeds a specified value while the pump is in operation.

The truck may not be always but often responsible for the interception of the electric circuit by the switch when the load current of the AC power supply of the lender's side exceeds the specified value because the truck is exposed to wind and rain while it is running and easily suffers from a damage in its electrical system. Therefore, when a collector drives the aforesaid truck to collect oil waste to a collection site, the collector must be very careful for not causing any trouble when the plug is connected to an outlet to use the AC power supply of the collection site or while the pump is in operation because the switch of the AC power supply of the lender's side might be activated to intercept the electric circuit.

SUMMARY OF THE INVENTION

The present invention is achieved to remedy the aforesaid problems. Another object of the present invention is to provide a multi-function truck which can prevent an accident such as a power failure caused by a switch intercepting an electric circuit at a collection site (e.g., a school, a restaurant, etc.) where a collected liquid is accumulated because a load current of an AC power supply of the lender's side exceeds a specified value while the pump is in operation.

To achieve the above-mentioned objects, the present invention provides a multi-function truck which has a load-carrying platform for carrying load and is equipped with a pump having a motor driven by electric power from an AC power supply and mounted in a space below the load-carrying platform, has a liquid collector loaded on the load-carrying platform and also has on the load-carrying platform a hose having the length enough to connect one pipe-end of a suction or a delivery of the pump to the liquid collector and a hose having the length enough to connect the other pipe-end of the pump to a on-site liquid container placed at a collection site containing a collected liquid, wherein a switch is disposed between a plug connected to the AC power supply and the motor, and if a load current exceeds a specified value due to a cause on the side of the truck, the electric current of the AC power supply of the lender's side automatically intercepted by the side of the truck.

A characteristic of the present invention is to change the suction and the delivery of the pump, so that the oil waste collected in the container on the load-carrying platform can be discharged by the same pump.

Another characteristic of the present invention is to extend the pipe-ends of both the suction and the delivery of the pump up to the above-mentioned load-carrying platform through the hoses so that the connecting hoses can be connected on the load-carrying platform, and workability can be improved.

A further characteristic of the present invention is to mount a generator in a space below the load-carrying platform, and the motor is designed to be driven by electric power from the generator.

A further characteristic of the present invention is to drive the motor provided with the pump selecting the electric power from the AC power supply or the generator mounted in the space below the load-carrying platform, and the generator can be selectively used immediately at a site where no AC power supply is available.

DESCRIPTION OF THE PREFERRED EMBODIMENTS

Figure 2:
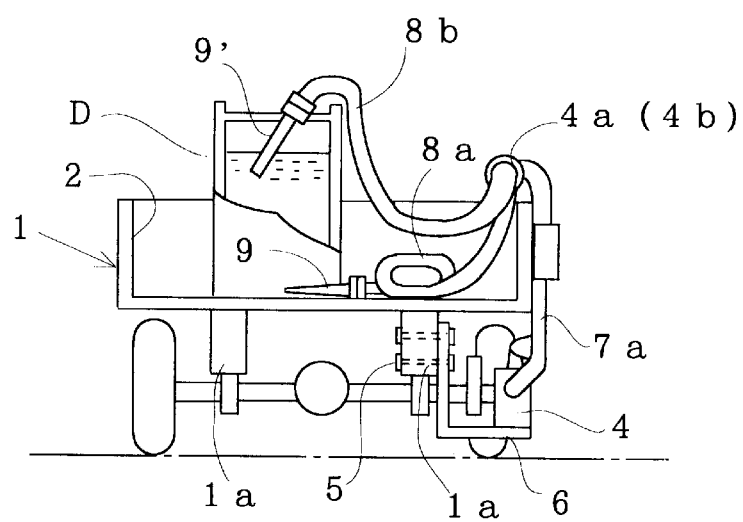
FIG. 2 is a cross section showing a relation between the load-carrying platform and the pump of the truck according to the embodiment of the present invention.
Figure 3:
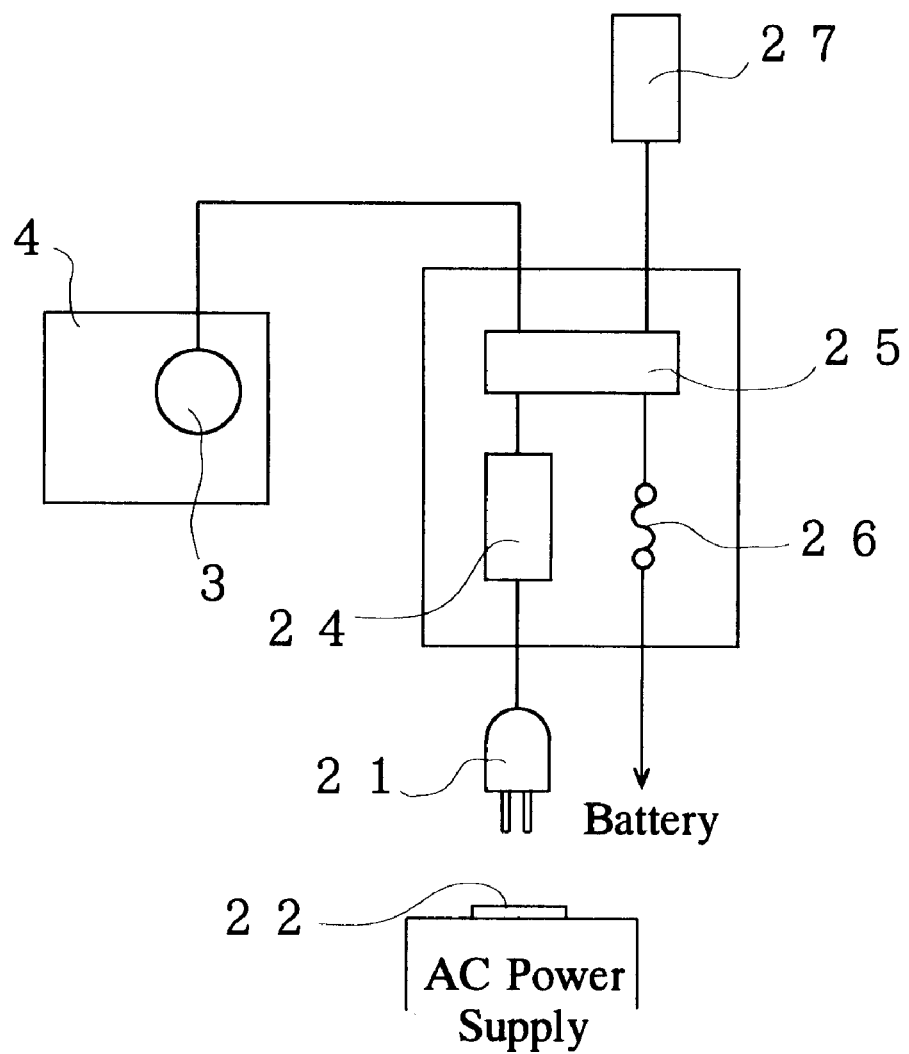
FIG. 3 is a brief explanatory diagram of a switch used in the embodiment of the present invention.

An embodiment of the present invention will be described in the following with reference to FIG. 1 to FIG. 3 accompanied.

A truck 1 according to the present embodiment has a load-carrying platform 2 for carrying load and a pump 4 with a motor 3 driven by electric power from an AC power supply and mounted in a space below the load-carrying platform 2. The aforesaid AC power supply is used by connecting a plug 21 connected to the motor 3 to an outlet 22 of an oil waste collection site (e.g., a school, a restaurant, etc.). Considering that the oil waste collection site is not equipped with an outlet of the AC power supply, the motor 3 has a structure that it can selectively receive electric power from a generator 23 which is mounted in a space below the load-carrying platform 2.

The motor 3, the pump 4 and the generator 23 are fixed on a shelf 6 which is attached by an appropriate fixing means 5 (e.g., screws) to a chassis 1a below the load-carrying platform 2 of the truck 1 according to the present embodiment. A configuration of the shelf 6 and an attaching method are not limited to the example shown in FIGS. 1 and 2.

A switch 24 is equipped in a space below the load-carrying platform 2. The switch 24 serves to automatically intercept the electric current of the AC power supply borrowed when a load current exceeds a specified value due to a cause on the side of the truck. The switch 24 is connected to the motor 3 through a relay control system 25. A power supply of the relay control system 25 is acquired from a battery (not shown) loaded on the truck 1 through a fuse 26. A remote-control switch 27 is extended from the relay control system 25 to the load-carrying platform 2.

A light 30 connected to a battery of the truck 1 is mounted in a space below the load-carrying platform 2.

Figure 1:
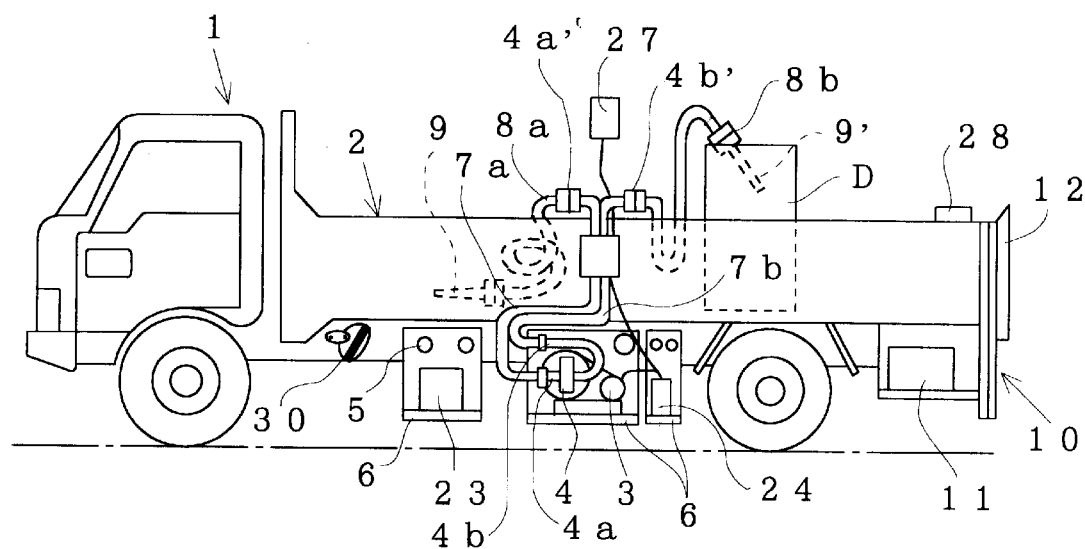
FIG. 1 is a side view of a truck according to an embodiment of the present invention.

The truck 1 is a cab-over truck as shown in FIG. 1 but may also be any type of trucks such as a van, a panel van, a light van and a pickup. The pump 4 is limited to be mounted in the space below the load-carrying platform 2, so that the load-carrying platform 2 can also serve as an ordinary platform for carrying load. If the space below the load-carrying platform 2 is not large enough to dispose the pump 4 therein, it can be enlarged to some extent toward the load-carrying platform 2.

The pump 4 is a rotary pump rotating a rotor in a special shape in a casing and a gear pump, a vane pump or a screw pump are particularly preferable for oil. The pump 4 has a suction pipe 4a and a discharge pipe 4b, and their pipe-ends 4a', 4b' are extended over the load-carrying platform 2 through hoses 7a, 7b. Thus, connecting hoses 8a, 8b can be connected to the respective pipe-ends 4a', 4b' on the load-carrying platform 2. The pump 4 can be selectively switched between a suction and a delivery by operating the remote-control switch 27 provided on the load-carrying platform 2.

The load-carrying platform 2 is loaded a liquid collector D (e.g., an oil container) thereon, and also the connecting hose 8b having the length enough to connect the pipe-end 4b' of the suction or the delivery of the pump 4 to the liquid collector D and the connecting hose 8a having the length enough to connect the other pipe-end 4a' of the pump 4 to a on-site liquid container (not shown) placed at the collection site containing the accumulated liquid. The connecting hoses 8a, 8b have a connecting means at both ends to allow the connection between the pipe-end 4a' or 4b' of the suction and the delivery of the pump 4 and the connection between a suction pipe 9 and a discharge pipe 9'. A filter (e.g., a net) not shown may be attached to the suction pipe 9.

The pump 4 is designed to be switchable between the suction and the delivery, so that the same pump can be used when the oil waste collected in the oil container D on the load-carrying platform 2 is poured into a storage tank (not shown).

The truck 1 is provided with a power gate 10, which is operated by another remote-control, switch 28 equipped on the load-carrying platform 2. The power gate 10 is designed to operate a gate 12 in vertical and horizontal as well as up and down directions by the motor 11 powered by the battery and can be conveniently used for loading or unloading the oil container D (a liquid collector) on or from the load-carrying platform 2.

When it is dark at a site in the evening or the night, the light 30 is turned on to light up the ground below and/or around the load-carrying platform 2 and make the work easier.

The truck 1 is also designed to mount thereon a conventional small crane (not shown) in stead of the power gate 10 or together with it. It is to be understood that the generator 23 may also be used as a power supply for the motor 11.

The hoses 7a, 7b and the connecting hoses 8a, 8b are preferably made of a transparent material because a difference between the supernatant fluid and the sediment can be visually checked depending on a color of the oil waste passing through the hoses.

The truck 1 can be used to transport load on its load-carrying platform 2 as well as to collect cooking oil waste. Specifically, the truck 1 loads an empty oil container D (a liquid collector) on the load-carrying platform 2 to an oil waste collection site (e.g., a school, a restaurant, etc.). The plug 21 pulled out of the motor 3 through the switch 24 is connected to the outlet 22 of the AC power supply of the collection site. FIG. 1 shows only one liquid collector D on the truck 1, but a plurality of liquid collectors D are actually loaded on the truck 1 considering an amount or kind of oil waste to be collected.

Then, the suction pipe 9 at the end of the connecting hose 8a connected to the suction pipe-end 4a' of the suction pipe 4a of the pump 4 is inserted into the oil container D (a on-site liquid container not shown) in which the oil waste is accumulated, while the discharge pipe 9' at the end of the connecting hose 8b connected to the discharge pipe-end 4b' of the discharge pipe 4b of the pump 4 is inserted into the oil container D on the load-carrying platform 2.

The pump 4 is driven to transfer the oil waste from the oil container D (a on-site liquid container) on site into the oil container D loaded on the truck 1. Even when the oil waste has settled to separate in a natural state within the oil container D (a on-site liquid container) at the site at the time of the collection, the separated condition is not disturbed, so that the supernatant fluid and the sediment can be collected separately. A degree of sedimentation can be distinguished from a color of the oil seen through the connecting hose 8a.

After completing the sequential collection of whole oil waste at the site, the collected oil waste is carried back to a base, poured into an oil waste storage tank and subjected to predetermined processing (e.g., sedimentation). The processed oil is sold to waste recycling companies or engineers.

In the above work, when the plug 21 extended from the motor 3 through the switch 24 is connected to the outlet 22 to use the AC power supply and the load current exceeds a specified value due to a cause of the side of the truck 1, the switch 24 automatically intercepts the electric circuit to stop the use of the AC power supply borrowed.

In such a case, the cause on the side of the truck 1 is examined, and when it is clarified and remedied, the operation of collecting the oil waste can be continued. On the other hand, when the cause is not clarified, the operation of collecting the oil waste has to be terminated. Therefore, no trouble is made to the lender's side of the AC power supply at all.

The truck 1 can also be for agricultural use. For example, it is facilitated that the oil container D loaded on the load-carrying platform 2 is filled with water pumped up from a river or a well, and then the water is supplied to crops at a dried area. The truck 1 according to the present embodiment is particularly advantageous on the point that the load-carrying platform 2 can also be used to transport crops, agricultural machines and the like as compared with a tank truck.

Furthermore, the truck 1 can load the oil container D filled with drinking water (river water can also be used as drinking water depending on the filtration ability of a filter attached to the suction pipe 9) on the load-carrying platform 2, so that it can be used as not only a water truck 1 but a relief supply transporting truck in case of a disaster, a drought or the like.

The invention is not limited to the above embodiments and various modifications are possible without departing from the spirit and scope of the invention. Any improvements may be made in part or all of the components.

What is claimed is:

1. A multi-function truck, comprising:

a load-carrying platform for carrying a load;

a pump having a motor, mounted in a space below said load carrying platform and driven by electric power from an AC power supply at a collection site;

a liquid collector loaded on said load-carrying platform, wherein said liquid collector can be unloaded from said load-carrying platform;

a first connecting hose having the length enough to connect a pipe-end of a suction or a delivery of said pump to said liquid collector loaded on said load-carrying platform;

a second connecting hose having the length enough to connect another pipe-end of said pump to receive collected liquid from an on-site liquid container placed at the collection site;

a plug for connecting said AC power supply to said motor; and a switch disposed between said plug and said motor, wherein said switch automatically intercepts electric current from said AC power supply, when a load of electric current exceeds a predetermined value, wherein a generator is mounted in a space below said load-carrying platform.

2. A multi-function truck, comprising:

a load-carrying platform for carrying a load;

a pump having a motor, mounted in a space below said load carrying platform and driven by electric power from an AC power supply at a collection site;

a liquid collector loaded on said load-carrying platform, wherein said liquid collector can be unloaded from said load-carrying platform;

a first connecting hose having the length enough to connect a pipe-end of a suction or a delivery of said pump to said liquid collector loaded on said load-carrying platform;

a second connecting hose having the length enough to connect another pipe-end of said pump to receive collected liquid from an on-site liquid container placed at the collection site;

a plug for connecting said AC power supply to said motor; and a switch disposed between said plug and said motor, wherein said switch automatically intercepts electric current from said AC power supply, when a load of electric current exceeds a predetermined value, wherein said motor mounted in the pump is driven by electric power selectively received from a generator mounted in a space below said load-carrying platform or said AC power supply.

3. A multi-function truck according to claim 2, wherein said motor mounted in the pump is driven by electric power selectively received from said generator mounted in a space below said load-carrying platform or said AC power supply.

* * * * *